May 24, 1955
H. E. CIER
2,709,155
PHOTOCHEMICAL SULFO-CHLORINATION
Filed Nov. 12, 1952
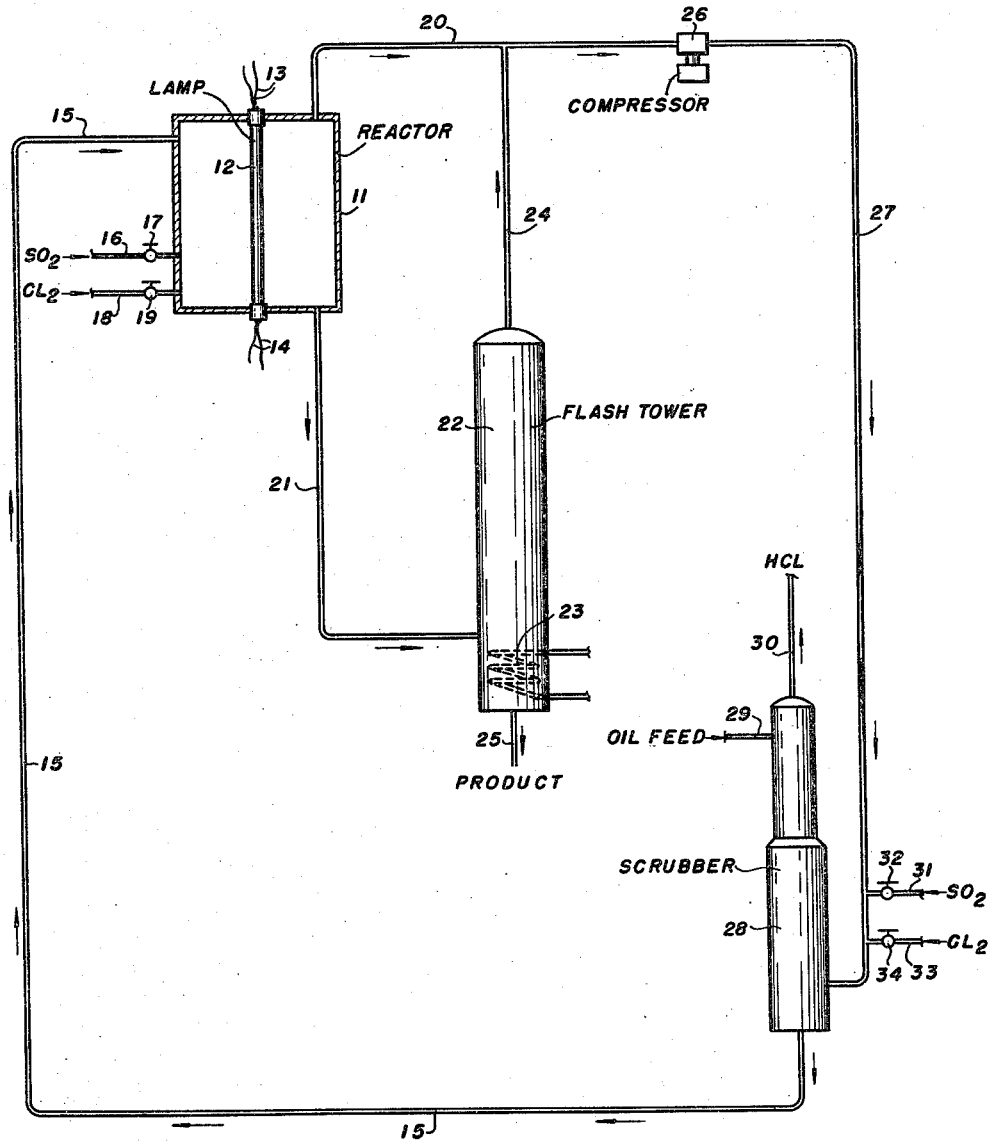
INVENTOR.
Harry E. Cier,
BY
AGENT.

2,709,155
Patented May 24, 1955

2,709,155

PHOTOCHEMICAL SULFO-CHLORINATION

Harry E. Cier, Baytown, Tex., assignor, by mesne assignments, to Esso Research and Engineering Company, a corporation of Delaware Application November 12, 1952, Serial No. 319,991

4 Claims. (Cl. 204—162)

The present invention is directed to a method of preparing a feed stock and recovering gases in sulfo-chlorination reactions. More particularly, the invention is directed to absorbing sulfur dioxide and chlorine in a hydrocarbon feed to a sulfo-chlorination reaction. In its more specific aspects, the invention is directed to recovering sulfur dioxide and chlorine unconsumed and produced in a sulfo-chlorination reaction of a hydrocarbon.

The present invention may be described briefly as a method for introducing sulfur dioxide and chlorine into a photochemical reaction zone and for recovering sulfur dioxide, chlorine, and hydrogen chloride unconsumed and produced in said reaction zone in which a gaseous mixture of sulfur dioxide, chlorine, and hydrogen chloride from the reaction zone is contacted with a hydrocarbon boiling in the range from 100° to 1200° F. under absorption conditions to absorb selectively the sulfur dioxide and chlorine and to allow recovery of the hydrogen chloride present in the gases. The hydrocarbon now containing dissolved sulfur dioxide and chlorine is then reacted in a reaction zone in the presence of light to produce a hydrocarbon sulfonyl chloride product and the gaseous mixture from which the sulfur dioxide, chlorine and hydrogen chloride are recovered.

In a photochemical sulfo-chlorination reaction the gases therefrom consist of hydrogen chloride, unreacted sulfur dioxide and chlorine and are discharged from the photochemical reactor partly as a gaseous stream or mixture and partly in solution in the liquid hydrocarbon sulfonyl chloride product. The liquid product containing the dissolved gases in accordance with the present invention may be pumped into a flash tower and the hydrogen chloride, sulfur dioxide and chlorine stripped off. These gases may then be admixed with the gaseous stream or mixture discharged from the reaction zone and the resulting admixture fed into an absorption tower with the hydrocarbon or oil which is to be sulfo-chlorinated. Conditions of temperature and pressure in the absorption tower are adjusted such that substantially all of the sulfur dioxide and chlorine is absorbed and the hydrogen chloride rejected.

Thus, the oil or hydrocarbons issuing from the absorption tower or scrubber, as it may be termed, will contain substantially all of the sulfur dioxide and chlorine with a very minor amount of dissolved hydrogen chloride. This feed is charged directly to the photochemical reactor along with additional sulfur dioxide and chlorine as required. The hydrogen chloride, if any, in the feed does not affect deleteriously the photochemical reaction. The hydrogen chloride recovered from the absorption or scrubbing tower may suitably be stored under pressure or absorbed in aqueous hydrochloric acid or water to form a commercial hydrochloric acid.

The feed stock of the present invention may suitably be a hydrocarbon such as a petroleum fraction boiling in the range from 100° to 1200° F. The feed stock should be a substantially wax-free oil since waxy oils will not allow sufficient recovery of the sulfur dioxide. The hydrocarbon may suitably be a heptane fraction or a fraction boiling in the gasoline or kerosene boiling range. Pure hydrocarbons may suitably form the feed stock introduced into the process as will be described.

The invention will be further illustrated by reference to the drawing in which the single figure is a flow diagram of a preferred mode.

Referring now to the drawing, numeral 11 designates a photochemical reaction zone in which is arranged an elongated lamp 12 such as a mercury vapor lamp which is provided with electrical conducting leads 13 and 14 connected to a suitable source of electrical energy.

Reaction zone 11 is provided with a feed inlet line 15 through which a hydrocarbon feed is introduced and with line 16 controlled by a valve 17 and a line 18 controlled by a valve 19 through which sulfur dioxide and chlorine, respectively, may be introduced.

In the reactor 11 the feed stock containing dissolved sulfur dioxide and chlorine is exposed to the light radiation from lamp 12 and the hydrocarbon is caused to undergo a sulfo-chlorination reaction to form a sulfonyl chloride product. As a result of this reaction hydrogen chloride is produced and there are quantities of unconsumed sulfur dioxide and chlorine, such as may be introduced by line 16 and line 18 as has been described. The unconsumed gases and those produced in the reactor 11 are partly in the sulfonyl chloride product and partly are removed from the reactor 11 by line 20 for further treatment as will be described.

The product containing dissolved gases issues from the reaction zone 11 by line 21 and is introduced thereby into a flash tower 22 which may be provided with a heating means such as steam coil 23 for adjustments of temperature and pressure in flash tower 22. The flash tower 22 should be so operated as not to expose the sulfonyl chloride product to excessive temperatures to avoid degradation of the product. The conditions are adjusted to remove from the sulfonyl chloride product the dissolved gases mentioned before which are discharged from the flash tower 22 by line 24 as a second gaseous stream which admixes with the first gaseous stream in line 20. The product substantially free of dissolved gases is discharged from flash tower 22 by line 25 and then may be suitably further treated to form sulfonates such as by neutralization by an alkali metal hydroxide, such as sodium hydroxide.

The gaseous streams in lines 20 and 24 are admixed in line 20 and are introduced into a compressor 26 which compresses the gases to a higher pressure and causes the discharge of the commingled streams by way of line 27 into a scrubber or absorption tower 28 which may contain internal contacting means for intimate contact between liquids and gases. The commingled gaseous mixture is contacted countercurrently in scrubber 28 with a hydrocarbon or oil feed introduced into the top of scrubber 28 by line 29 and the gases are thus countercurrently contacted under conditions so that the sulfur dioxide and chlorine contained in the stream in line 27 are absorbed selectively and the hydrogen chloride rejected. The hydrogen chloride is recovered from scrubber 28 by line 30 and may suitably be stored under pressure or used to form hydrochloric acid. The oil now contains the dissolved sulfur dioxide and chlorine and is then withdrawn from scrubber 28 by line 15 and introduced thereby as has been described into reactor 11 for reaction with the sulfur dioxide and chlorine to form the sulfonyl chloride product and the gaseous mixture.

It may be desired to introduce all of the sulfur dioxide and chlorine into the oil feed in scrubbing tower 28 since it is possible to control the amount of sulfur dioxide and chlorine by this means. I have, therefore, provided line 31 controlled by valve 32 and line 33 controlled by valve 34 through which sulfur dioxide and chlorine, respectively, may be introduced into line 27 and thence into scrubbing tower 28.

My invention allows recovery of the unconsumed and produced gases and besides provides a method of introducing the sulfur dioxide and chlorine into the reaction zone.

The temperatures in reaction zone 11 may vary from about 75° to 225° F. with good results being obtained with the hydrocarbon feeds mentioned at a temperature of approximately 150° F. The temperatures employed in tower 28 ordinarily will encompass the temperatures used in zone 11; namely, temperatures in the range from 75° to 225° F. Pressures used in absorber or scrubber 28 will ordinarily be equal to or less than the vapor pressure of $SO_2$ at the operating temperature and in no case should exceed the vapor pressure of $SO_2$ at the operating temperature. As an example, when scrubber 28 is operated at 150° F., the vapor pressure of $SO_2$ at this temperature is about 165 pounds per square inch gauge. The pressure, therefore, should be no greater than this figure and, preferably, less for best results.

The ratio of the oil feed into tower 28 to the sulfur dioxide and chlorine introduced therein will suitably be in the range from 1–10 volumes of liquid hydrocarbon to 20 volumes of gaseous sulfur dioxide and chlorine. Actually, the solubility characteristic of sulfur dioxide in the oil feed and the operating conditions in scrubber 28 will determine the relative ratios of oil to sulfur dioxide and chlorine.

The nature and objects of the present invention having been completely described and illustrated, what I wish to claim as new and useful and to secure by Letters Patent is:

1. A method for conducting a photochemical reaction which comprises introducing hydrocarbon feed stock, sulfur dioxide and chlorine into a photochemical reaction zone, forming hydrocarbon sulfonyl product therein and removing said hydrocarbon sulfonyl product, sulfur dioxide, chlorine, and hydrogen chloride from said photochemical reaction zone and removing therefrom a gaseous mixture of sulfur dioxide, chlorine, and hydrogen chloride, contacting said gaseous mixture with fresh hydrocarbon feed stock boiling in the range from 100° to 1200° F. in an absorption zone at a temperature within the range from 75° to 225° F. at a pressure no greater than the vapor pressure of sulfur dioxide at the temperature of said absorption zone under conditions to absorb selectively said sulfur dioxide and chlorine in said hydrocarbon in said absorption zone, recovering hydrogen chloride from said absorption zone, and then reacting in said reaction zone in the presence of light said hydrocarbon containing absorbed sulfur dioxide and chlorine to produce said hydrocarbon sulfonyl chloride product and said gaseous mixture.

2. A method in accordance with claim 1 in which at least a portion of the gaseous mixture is recovered from said hydrocarbon sulfonyl chloride product and said product is substantially freed of gaseous mixture.

3. A method for conducting a photochemical reaction which comprises introducing hydrocarbon feed stock, sulfur dioxide and chlorine into a photochemical reaction zone, forming hydrocarbon sulfonyl chloride product therein and removing from said photochemical reaction zone a hydrocarbon sulfonyl chloride product containing dissolved sulfur dioxide, chlorine, and hydrogen chloride and a first gaseous mixture of sulfur dioxide, chlorine and hydrogen chloride, flashing said hydrocarbon sulfonyl chloride product under conditions to remove substantially from said hydrocarbon sulfonyl product dissolved sulfur dioxide, chlorine, hydrogen chloride as a second gaseous mixture, commingling said first and second gaseous mixtures, contacting said commingled gaseous mixtures under absorption conditions in an absorption zone with fresh hydrocarbon feed stock boiling in the range from 100° to 1200° F. at a temperature within the range from 75° to 225° F. at a pressure no greater than the vapor pressure of sulfur dioxide at the temperature of said absorption zone under conditions to absorb selectively in said fresh hydrocarbon feed stock said sulfur dioxide and chlorine in the commingled gaseous mixtures, recovering hydrogen chloride from said absorption zone, passing said fresh hydrocarbon feed stock containing absorbed sulfur dioxide and chlorine to said reaction zone and there reacting it in said reaction zone in the presence of light to produce said hydrocarbon sulfonyl product and gaseous mixtures.

4. A method in accordance with claim 3 in which the hydrocarbon feed stock is a wax-free oil.

References Cited in the file of this patent
UNITED STATES PATENTS

| | | |
|---|---|---|
| 2,193,824 | Lockwood et al. | Mar. 19, 1940 |
| 2,528,320 | Roberts et al. | Oct. 31, 1950 |
| 2,683,076 | Cier et al. | July 6, 1954 |